(12) United States Patent
LeBeaux et al.

(10) Patent No.: US 9,131,076 B2
(45) Date of Patent: Sep. 8, 2015

(54) SYSTEM, METHOD AND COMPUTER PROGRAM PRODUCT FOR FACILITATING OPTICAL DATA TRANSFER TO A MOBILE DEVICE

(71) Applicants: Kelvin Patrick LeBeaux, San Jose, CA (US); Adley Da Silva, Margate, FL (US)

(72) Inventors: Kelvin Patrick LeBeaux, San Jose, CA (US); Adley Da Silva, Margate, FL (US)

( * ) Notice: Subject to any disclaimer, the term of this patent is extended or adjusted under 35 U.S.C. 154(b) by 0 days.

(21) Appl. No.: 14/048,408

(22) Filed: Oct. 8, 2013

(65) Prior Publication Data

US 2015/0097973 A1 Apr. 9, 2015

Related U.S. Application Data

(60) Provisional application No. 61/760,927, filed on Feb. 5, 2013.

(51) Int. Cl.
*H04B 10/00* (2013.01)
*H04N 1/00* (2006.01)
*H04N 5/225* (2006.01)

(52) U.S. Cl.
CPC ........... *H04N 1/00111* (2013.01); *H04B 10/00* (2013.01); *H04N 1/00214* (2013.01); *H04N 5/225* (2013.01)

(58) Field of Classification Search
CPC .. H04B 10/11; H04B 10/114; H04B 10/1141; H04B 10/1149; H04B 10/116; H04B 10/50; H04B 10/60; H04N 1/00214; H04N 5/225; G06K 19/06009
See application file for complete search history.

(56) References Cited

U.S. PATENT DOCUMENTS

| | | | |
|---|---|---|---|
| 8,031,375 B2 | 10/2011 | Yoshida | |
| 8,203,423 B2 | 6/2012 | Ozolins | |
| 8,253,982 B2 | 8/2012 | Yoshida | |
| 2004/0020989 A1* | 2/2004 | Muramatsu | 235/462.1 |
| 2005/0125301 A1* | 6/2005 | Muni | 705/23 |
| 2005/0251725 A1 | 11/2005 | Huang et al. | |
| 2008/0132163 A1 | 6/2008 | Iian et al. | |
| 2009/0165140 A1 | 6/2009 | Robinson et al. | |
| 2010/0004984 A1 | 1/2010 | Beyabani et al. | |
| 2010/0272193 A1* | 10/2010 | Khan et al. | 375/259 |
| 2011/0137706 A1* | 6/2011 | Howard et al. | 705/7.29 |
| 2011/0188071 A1 | 8/2011 | Yoshida | |
| 2012/0056077 A1 | 3/2012 | Canini et al. | |
| 2013/0020386 A1 | 1/2013 | Yoshida | |

* cited by examiner

*Primary Examiner* — Darren E Wolf

(57) ABSTRACT

A system, method and computer program product for optically transferring a digital data file to a mobile electronic device having a video capturing function uses an instruction set hosted on a system of the type having a computer and memory storage connected to a video transmitter and a video display unit. The data transferring method encodes the digital data file into a plurality of discrete elements according to a pattern protocol. A portion of the video signal transmission is dedicated to display the pattern, and the encoded digital data file is embedded in the video signal transmission. The video signal transmission is transmitted to and displayed on the video display. A user directs the mobile electronic device at the video display and captures the video display including the encoded pattern representing the digital data file. The pattern is then decoded into a copy of the digital data file.

17 Claims, 3 Drawing Sheets

SYSTEM, METHOD AND COMPUTER PROGRAM PRODUCT FOR FACILITATING OPTICAL DATA TRANSFER TO A MOBILE DEVICE

CROSS REFERENCE TO RELATED APPLICATIONS

This is a non-provisional patent application that claims the benefit of co-pending U.S. provisional patent application No. 61/760,927 filed Feb. 5, 2013, which is incorporated herein by reference in its entirety.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE DISCLOSURE

1. Technical Field

The present disclosure generally relates to transferring digital data, and more particularly to optically transferring digital data between a source and a mobile device.

2. Prior Art

Mobile telephony has rapidly grown since the introduction of the cell networks in the late twentieth century. As such, cell phones have technologically evolved rapidly from large single function devices solely for making and receiving telephone calls and starting in the early 1990's to smart phones that include multiple functions in addition to functioning as a telephone. A smart phone is a high-end mobile phone that offers more advanced computing ability and connectivity than a contemporary mobile phone having a primary purpose as a telephone. Smart phones combine the functions of a personal digital assistant and a mobile phone, and today's models typically also serve as portable media players and camera phones with high-resolution touch screens, GPS navigation, Wi-Fi connectivity and mobile broadband Internet access. Smartphones now make up an every growing and significant portion of all mobile phones.

Today's smart phones employ one of multiple available operating systems depending on the design of the device, and can function as the equivalent of small personal computers. With the incorporation of a dedicated operating system, the various developers also offer applications for hosting on the smart phones, tablet computers, and other portable electronic devices to perform various software functions depending on the desires and needs of the user. The available applications can be platform and developer specific or can be third-party applications that are executable using an application programming interface. While software applications for laptop or tower type computers are generally purchased on hard media, such as CD's or downloaded from an Internet website for installation on the computer, the small size and mobile nature of a smart phone, a tablet computer, and other portable electronic devices often precludes such means for obtaining and installing applications. Since a smart phone or other small smart devices have input capabilities that are limited or restricted to electronic transfer of files, such transfer must typically be accomplished over a subscriber network permitting the transfer of data files.

The dramatic increase in the demand for and the number of applications available for mobile electronic devices has driven the industry to develop alternate methods for a user to acquire data files or applications in lieu of utilizing hard media or through expensive subscriber networks. In the absence or unavailability of such subscriber networks, the introduction of applications or the transfer of data files to the smart phone becomes problematic. Therefore, a method for transferring digital files by other than an electronic subscriber network is needed.

A method of transferring data optically is disclosed in U.S. Pat. No. 5,488,571, entitled "Method and Apparatus for Downloading Information form a Controllable Light Source to a Portable Information Device," issued to Jacobs et al. on Jan. 30, 1996 (herein referred to as the Jacobs patent). The Jacobs patent describes transferring binary data, serially, to an external device, equipped with a photo sensor. The proprietary device decodes the data using the raster scan of a CRT screen for timing. This method restricts the bandwidth of the data by limiting the stream to a serial transfer. This method is also limited to using a CRT screen, and not modern LED, LCD, and plasma monitors and televisions.

A method of transferring data optically, was disclosed in U.S. Pat. No. 6,281,820, entitled "Methods and Apparatus for Transferring Data from a Display Screen," issued to Fields on Aug. 28, 2001 (herein referred to as the Fields patent). The Fields patent discloses a method of transferring data to a proprietary apparatus, equipped with a photo sensor, via a CRT or LCD. This method only transmits data serially to the photo sensor, and does not transmit data in a parallel method to a camera within a portable device.

A method of transferring data wirelessly, without being connected to a network, was disclosed in U.S. Pat. No. 6,766,382, entitled "Method of Information Transfer Using Optical Zones," issued to Madden on Jul. 20, 2004 (herein referred to as the Madden patent). The Madden patent discloses a method of transferring data optically from a computer's monitor using optical line pulses within certain parallelogram shaped areas displayed on the monitor. The Madden patent also uses a proprietary external optical sensor connected to a portable device for receiving the data, and not a built-in camera. The Madden patent also transmits by illuminating two or three primary colors according to a specific sequence, and does not allow utilize native YUV to encode and transmit data.

A method of transferring data wirelessly, without being connected to a network, was disclosed in U.S. Pat. No. 6,798,445, entitled "System and Method for Optically Communicating Information Between a Display and a Camera," issued to Brumitt on Sep. 28, 2004 (herein referred to as the Brumitt patent). The Brumitt patent discloses a method for transferring data optically from one PC to another PC. The Brumitt patent describes transferring characters via specific line patterns, and does not address transmitting other forms of binary data.

A method of transferring data wirelessly, without being connected to a network, was disclosed in U.S. Pat. No. 7,124,953, entitled "Visual Encoding of a Content Address to Facilitate Data Transfer in Digital Devices," issued to Antilla et al. on Oct. 24, 2006 (herein referred to as the Antilla patent). The Antilla patent discloses a method of transferring a one frame, 2D barcode or QR code to another portable device for the sake of transferring a BLUETOOTH® address or URL to another device.

A method of transferring data wirelessly, without being connected to a network, was disclosed in U.S. Pat. No. 7,967,217, entitled "Information Reproduction/I/O Method Using Dot Pattern, Information Reproduction Device, Mobile Information I/O Device, and Electronic Toy," issued to Yoshida on Jun. 28, 2011 (herein referred to as the Yoshida patent). The Yoshida patent is limited to transferring digital data via a monochrome dot pattern to an optical device. This method does not use color to transfer data to a CMOS a portable devices camera.

Accordingly, a need remains for a system, method and computer program product for optically transferring a digital data file from a computing system to a mobile device that overcomes at least one of the aforementioned shortcomings.

BRIEF SUMMARY OF THE DISCLOSURE

The present disclosure meets the above-mentioned needs by providing at least one of a system, method, and computer program product for facilitating optical data to a mobile device. The present disclosure is generally directed to a system and method that satisfies the need for transferring digital files to a mobile electronic device by other than an electronic subscriber network wherein the mobile electronic device has a video capturing function and further uses an executable application which decodes the data streaming from the device's camera. The transmitting side of the system consists of proprietary encoding hardware connected to a video display unit; or a type having a computer and memory storage connected to a video display unit; or a pre-encoded media format playing within it native hardware connected to a video display unit, for displaying a visual representation of a the data for reception by the portable device.

The data transferring method includes encoding the digital data file to correspond to multiple color levels and a plurality of discrete visual elements according to a color and pattern protocol for embedment in the video signal transmission. A portion of the video signal transmission is dedicated for display of the encoded digital data file, and the encoded digital data file is embedded in the video signal transmission. The video signal transmission is transmitted to and displayed on the video display. A user directs the video capturing function of the mobile electronic device at the video display and captures the video display including the encoded color pattern representing the digital data file. The application running on the portable device recognizes the data area, zooms in on the data area, and compensates for user motion, capturing the pattern. The pattern is then decoded into a copy of the original digital data file.

BRIEF DESCRIPTION OF THE SEVERAL VIEWS OF THE DRAWING

The novel features believed to be characteristic of this disclosure are set forth with particularity in the appended claims. The disclosure itself, however, both as to its organization and method of operation, together with further objects and advantages thereof, may best be understood by reference to the following description taken in connection with the accompanying drawings in which:

DETAILED DESCRIPTION OF THE DISCLOSURE

The non-limiting exemplary embodiment(s) will now be described more fully hereinafter with reference to the accompanying drawings, in which a preferred embodiment of the disclosure is shown. Such exemplary embodiment(s) may, however, be embodied in many different forms and should not be construed as limited to the embodiment set forth herein. Rather, these embodiment(s) are provided so that this application will be thorough and complete, and will fully convey the true scope of the disclosure to those skilled in the art.

The below disclosed subject matter is to be considered illustrative, and not restrictive, and any appended claim(s) are intended to cover all such modifications, enhancements, and other embodiment(s) which fall within the true scope of the non-limiting exemplary embodiment(s). Thus, to the maximum extent allowed by law, the scope of the non-limiting exemplary embodiment(s) is to be determined by the broadest permissible interpretation of the claim(s) and their equivalents, and shall not be restricted or limited by the foregoing detailed description.

References in the specification to "an exemplary embodiment", "an embodiment", "a preferred embodiment", "an alternative embodiment" and similar phrases mean that a particular feature, structure, or characteristic described in connection with the embodiment(s) is included in at least an embodiment of the disclosure. The appearances of the phrase "a non-limiting exemplary embodiment" in various places in the specification are not necessarily all meant to refer to the same embodiment.

Figure 1:
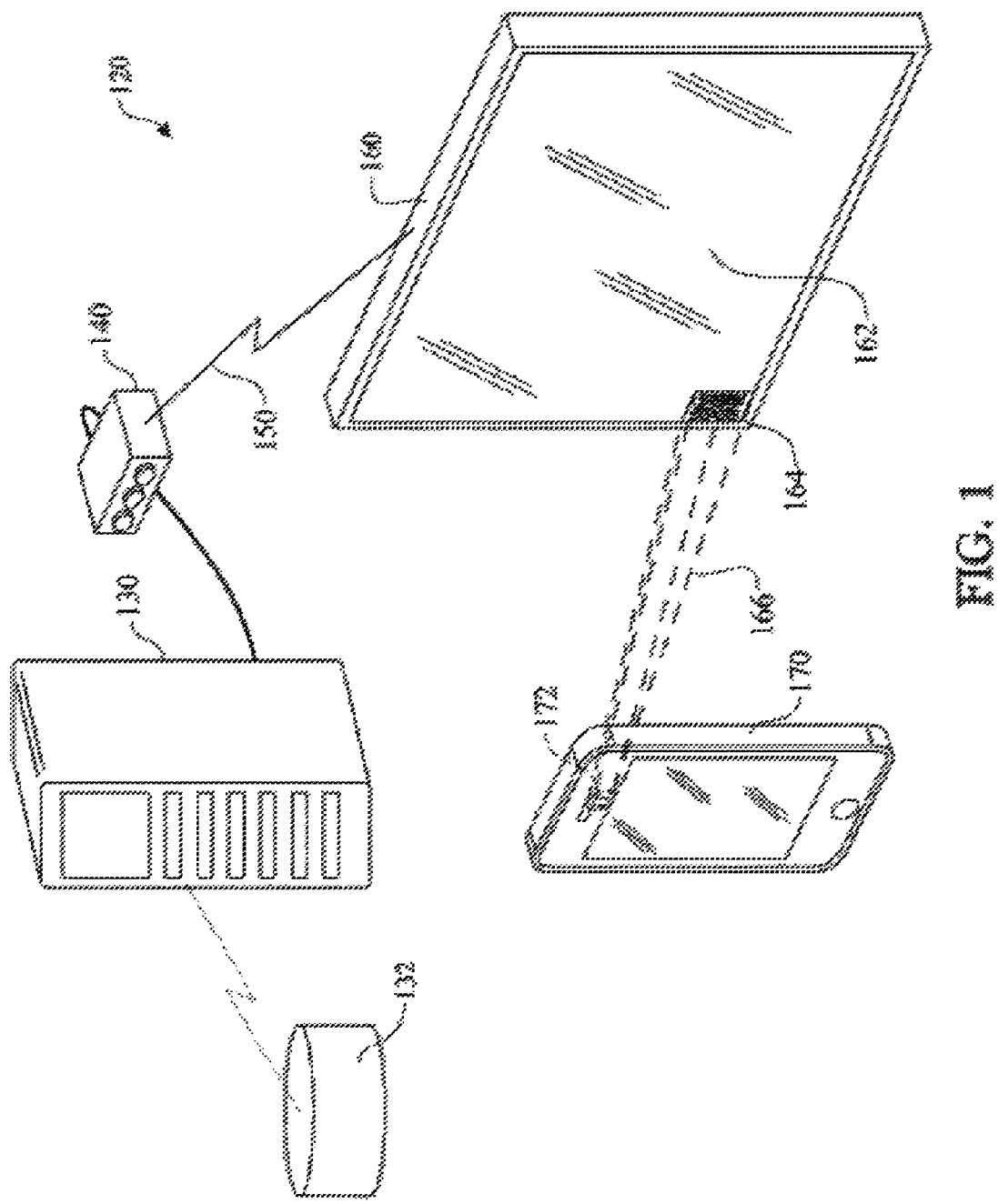
FIG. 1 is a high level schematic diagram of a file transfer system for facilitating optical data transfer from a display device to a mobile device, in accordance with a non-limiting exemplary embodiment of the present disclosure.

Referring initially to FIG. 1, a non-limiting exemplary embodiment of the present disclosure is illustrated as a system 120 for optically transferring a digital data file to a mobile electronic device. System 120 generally includes a computer 132 (e.g., computing device 100) having an associated memory unit 132 connected for electronic communication therewith or a microprocessor computer and with its associated memory within a dedicated hardware solution. Computer 130 can be of many forms such as a microprocessor, laptop, a tower, or a server, or other such device having a central processing unit (CPU) operating under an operating system instruction set typically retained in memory unit 132. Memory unit 132 further has retained therein an instruction set for encoding a digital data file into a plurality of discrete visual elements according to a pattern protocol for embedment into a video signal transmission. See FIG. 3 for a more detailed description of an exemplary computing device 100 (e.g., computer 130).

In a non-limiting exemplary embodiment, computer 130 is electronically communicative with a video transmitter 140 that, in turn, transmits a video transmission signal 150 to a video display unit 160. Those of ordinary skill in the art will readily recognize that video transmitter 140 may be a subset of the computer 130 hardware or may be a standalone unit, or may be an existing video player that is playing its native media with pre-encoded data, or may be a broadcast video receiver that is transmitting a video broadcast that has be encoded with the transmitted data such as illustrated in FIG. 1 and transmits a desired video signal to video display unit 160 utilizing known video protocols to produce a desired video display 166 on a screen 162 of display unit 160. Video transmission signal 150 can be a hard wired transmission such as over a video cable utilizing known electronic or optical signal transmission protocols, or alternatively can be a remote broadcast signal wherein video display unit 160 captures a wireless signal 150 using an antenna (not shown). A data display section 164 of screen 162 is reserved for display of the pattern encoded by the protocol of the encoding instruction set.

In a non-limiting exemplary embodiment, the information presented in the data display section 164 can be controlled by the user through the video encoder/server hardware. This includes the number of discrete color levels, the size of the window, the number/size of discrete elements (e.g., array of discrete elements), the encoded protocol, and the like. The presented frequency of images (frame rate) of the data display section 164 can additionally be established and controlled by the user.

In a non-limiting exemplary embodiment, the user has a mobile electronic device 170 such as a smart phone, for example, or another portable electronic device suitable for performing the functions of the present disclosure. Mobile electronic device 170 includes a central processor and memory residing within device 170 and is operating using an operating system and executable decoding application residing in the memory and executed by the central processor. Thus, mobile electronic device 170 is merely one example of a computing device 100 (e.g., computer 170) capable of performing the functions of the present disclosure. Additionally, the mobile electronic device 170 includes a video capture device such as a camera 172.

Figure 2:
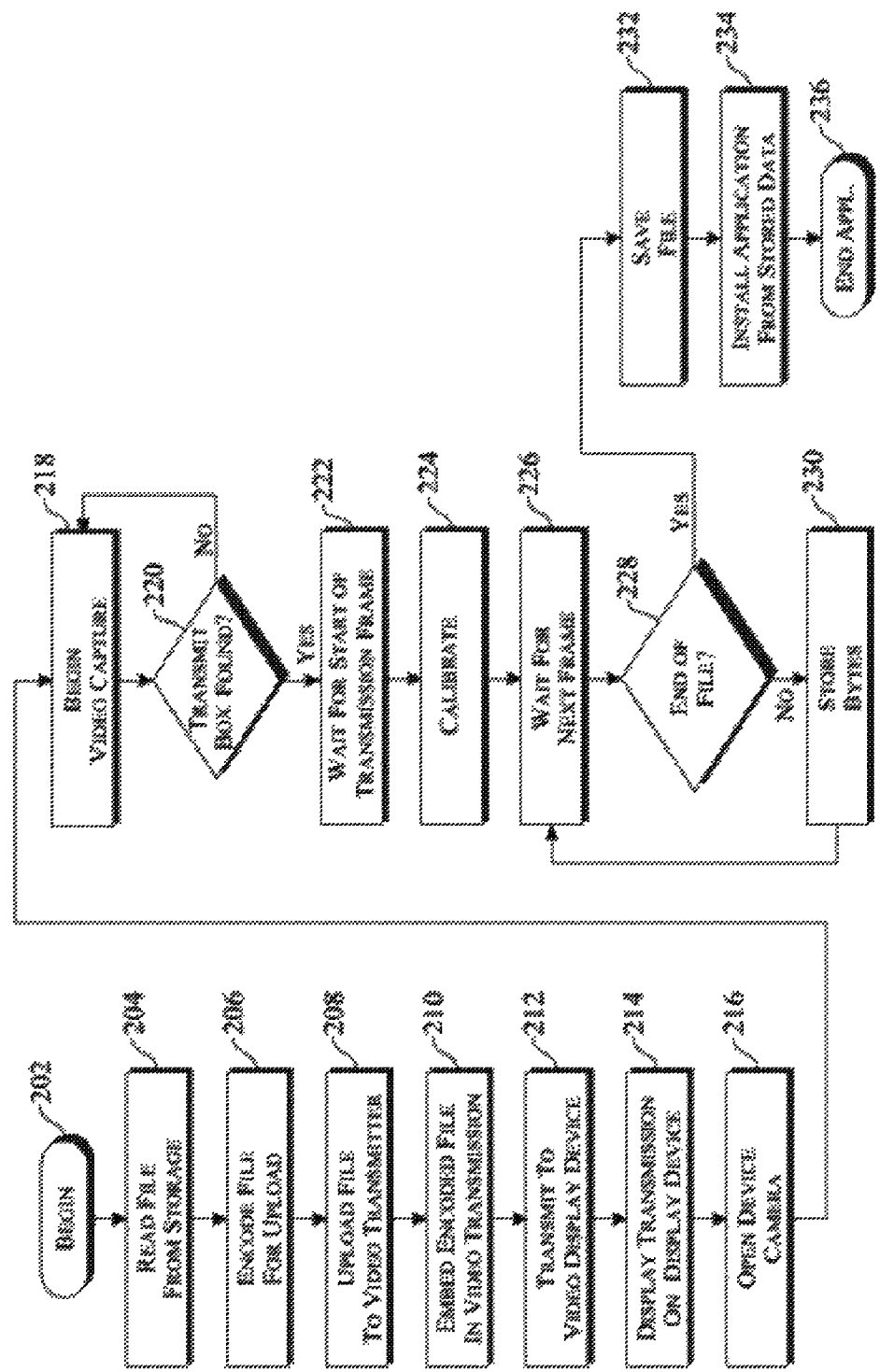
FIG. 2 is flow diagram illustrating an exemplary process for facilitating optical data transfer to a mobile device, in accordance with a non-limiting exemplary embodiment of the present disclosure.
Figure 3:
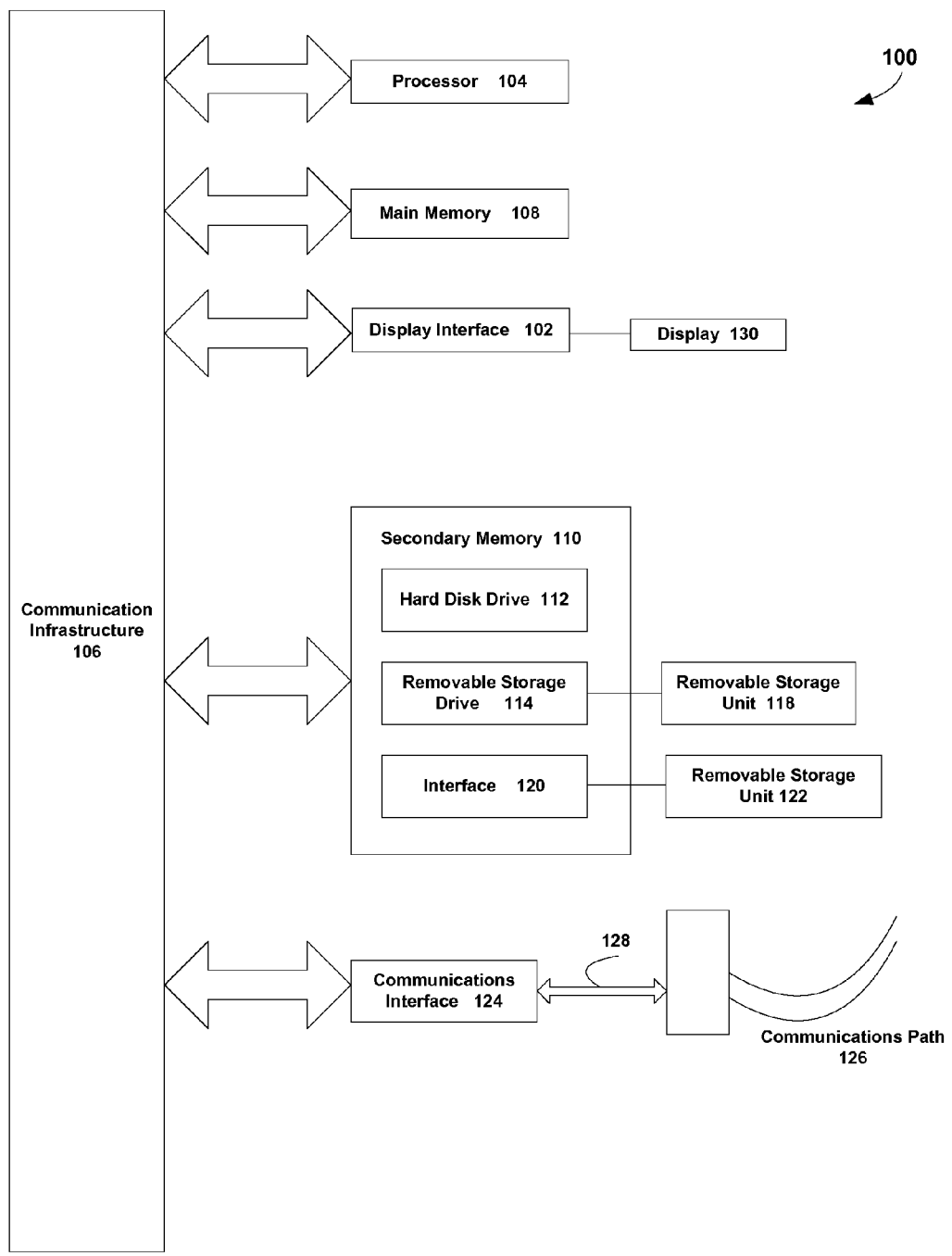
FIG. 3 is a high level schematic block diagram illustrating a computing device capable of executing a control logic algorithm for facilitating optical data transfer to a mobile device, in accordance with a non-limiting exemplary embodiment of the present disclosure.

In a non-limiting exemplary embodiment, a user is able to transfer a digital data file or executable application to mobile electronic device 170. The file transfer process 200 by which the data file (e.g., digital data file)

is transferred, is illustrated in the flow diagram of FIG. 2. It is noted that the steps described in block 204 through block 214 provide a video server portion of the system. The additional steps, identified by block 216 through block 236, describes a mobile device portion of the system. In block 202 the process begins. The digital data file to be transferred can either reside in the memory unit 132 or be uploaded to memory unit 132 in a manner well known in the industry and, in block 204, computer 130 reads the digital data file from memory 132. Exemplary embodiments of memory 132 are illustrated in FIG. 3.

In a non-limiting exemplary embodiment, in block 206, computer 130 executes the data encoding instruction set. The data file is transformed to its encoded form in the following manner for display on section 164 of display screen 162. The encoded visual data starts with a box that forms the data display window. For security, the encoded file can also include authentication information such as the identification of the computer or server 130, the file's author, a security certificate, or other identification data known to the industry wherein the user is further given the option to view the authentication information prior to downloading the data file. The first frame of the transfer includes calibration elements, which allows the application to store color and luminance calibration information for the entire data display window. A synchronization element is used to notify the application when the next frame of data is available, and is used to keep track of the frame number. The remainder of the data file is represented by other elements in subsequent frames that are located within the data display window, while the synchronization element is flashed on and off to notify the application when the next series of data elements are available.

In a non-limiting exemplary embodiment, the data can be streamed in a serial manner, using only one data element per frame, thus using less visual space of the display and thereby minimizing the size required for data display section 164 of display screen 162. However, by transmitting the digital file in a serial manner the time required for transfer will be greater.

In a non-limiting exemplary embodiment, the data can be streamed in a parallel manner. Parallel transfer of the file reduces the required transfer time, but in return requires a larger sized data display section 164 in display screen 162. For instance, in an eight element parallel transfer, there are eight data locations (eight element positions) within the data display window. In the monochrome operation of this method, when a white element is present in a particular position at a given time, the bit value is a 1, and if no element is present, the bit value is a 0. The resolution can be changed to the user's specification, (i.e. the number of pixels used to represent an element). Higher resolutions utilize fewer pixels to represent each element, and more elements within the data display window on the video display unit 160.

In a non-limiting exemplary embodiment, basic encoding of the digital data file is accomplished by displaying white elements on a black background. In such an encoding scheme, each element represents one bit of the data file.

In a non-limiting exemplary embodiment, the unique pattern of discrete visual elements is formatted in black and white.

In a non-limiting exemplary embodiment, the unique pattern of discrete visual elements is formatted in color.

In a non-limiting exemplary embodiment, the unique pattern of discrete visual elements is formatted in a dot pattern.

In a non-limiting exemplary embodiment, the unique pattern of discrete visual elements is has a predetermined geometric shape.

In a non-limiting exemplary embodiment, more advanced encoding is also possible through the use of colored elements. In this advanced encoding scheme, each colored element represents an octal, decimal, hexadecimal, or other numerical system value. For example, in a 64-bit per frame parallel transfer arrangement, the synch window may have eight data element locations (element positions) and eight different colors for each element. If there is no element in a location at a given time, the data value is 0; otherwise the data value is determined by the element's color. A particular color's numerical value is readily readable as a particular binary combination corresponding to the portion of the data file being transferred by the colored element. The position of the element within the data display window in screen section 164 represents a certain data value and position in the data stream.

In a non-limiting exemplary embodiment, the system's frame resolution can be changed from serial transfer (one bit per element per data display window using only one white element color) to, theoretically, up to the total number of pixels within the data display window times the number of colors used. Practically, the resolution of system 120 is limited by the quality of display 160, the distance the user is removed from or away from display 160, and the quality of the video capture function of mobile electronic device 170.

In a non-limiting exemplary embodiment, a major part of the process is the codec, known as the encoder/decoder, which uses location and color as the major method of encoding and decoding the data being transmitted. This codec is what will insure high data transfer rates with quality data integrity as well. The encoder uses at least four layers of information to encode and decode the information into the transmitted data elements and extract information from the received data elements: location and 3 layers of color information. The data can be encoded and decoded using the RGB color model, YUV color model, HSV color model or other suitable color models that can be processed with the portable electronics device's operating system. The RGB codec will encode and decode data base on the elements location and red color level, green color level, and blue color level information within data display. The discrete digitized values of each of these color levels and the location from each element are stored in a byte array, then the array is checked for errors and corrected as needed. Once all of the data display frames have been detected and stored, any errors in the data are corrected; the data is then formatted to recreate the original file and saved into the portable device's nonvolatile memory. Once the file is saved, it can be instantly installed, if it is an application, or it can be opened by other programs if it is some other type of file. The data can also be created similarly with each of the other color models.

In a non-limiting exemplary embodiment, the level of discrete color values that are used can be adjusted. Less discrete color values will give wider spacing in between colors and further combat errors that may occur. During the color encoding and decoding process, the display area will be surrounded by a white border to allow the application to determine where the data display box is. The very first screen shown will indicate the start of the transmission and calibrate the application to decode data from subsequent frames. The location of the color calibration elements will be in a known place in relation to the border, and the color calibration elements will be used to compare a current data position's color information with a known standard.

In a non-limiting exemplary embodiment, the next frame describes the format of the file, length of the file, format of the element positions, and information about the encoding level to be used. The synchronization element will be in known location. It will flash from black to a colored value with the passing of each frame so that the codec will know when a new page of data is available. During decoding the synchronization element will be used to advance to data position counter up. Color calibration elements can also be present during each frame of the transmission because changes in ambient light conditions and other sources of noise may distort the colors from the time the video recording begins and ends. When the lighting conditions change, the presence of known color values at on each frame will give a reliable standard to compare to.

In addition to the location and color encoding and decoding method, additional redundant data is also added to the original data for the purpose of forward error correction. Gray coding can also be employed to further prevent errors. Interleaving error correction and detection is employed as an easy way to quickly detect and corrected errors that may occur. Block coding methods are used to carry out the error detection and correction using each frame as a separate block. Turbo code or low density parity check code is the coding method of choice since they are both newer constructs and would provide the highest efficiency. However, any other FEC coding methods may also be used with this system since these methods are preprocessed before the transmission of the data and post-processed after the data is decoded using the color decoding method first.

In a non-limiting exemplary embodiment, in block 208 the encoded file is uploaded to the video transmitter, and in block 210 the uploaded encoded file is embedded in the video transmission stream and then transmitted in block 212. Those of ordinary skill in the art will readily recognize that while the process steps of blocks 206, 208, 210, and 212 are presented as occurring serially, one or more of the block functions can be performed in a parallel or near parallel manner as well known in the industry. The video transmission 150 being broadcast or transmitted by video transmitter 140 is captured by video display unit 160 and in block 214 is displayed on video screen 162 with the encoded data file being displayed in a serial or parallel data stream in data display section 164.

In a non-limiting exemplary embodiment, computer 130 repeatedly streams the data file over and over again in a continuous manner. In a second embodiment, a visual data server or computer 130 accepts inquiries via existing wireless communications technology and protocols, and in response to the inquiry visually serves the data file on a one-time basis once an authenticated request has been received. This embodiment requires additional hardware encompassing existing wireless communications technology.

In a non-limiting exemplary embodiment, once the digital data file has been encoded, embedded and dynamically displayed on screen 162 of video display unit 160, the encoded file can be captured by mobile electronics device 170. In block 216, the user of mobile electronics device 170 initiates execution of the custom file transfer application on mobile device 170 thereby activating the video capture function of mobile device 170. This is usually accomplished by activating the camera function of device 170. In block 218 the user directs camera 172 of mobile device 170 at video display 160 to capture the streaming video 166 of the digital data file to be transferred. In block 218, device 170 begins capturing streaming video 166 of the encoded digital data file. The data display window border displays the entire time of the transmission and synchronization element flashes at a specified rate in section 164 of screen 162 so that the data frame in section 164 can be located by the video capturing function of mobile electronic device, and the data can be synchronized and decoded.

In a non-limiting exemplary embodiment, in block 220 the file transfer application on device 170 determines whether the transmission box in section 164 has been detected. If the box has not been detected, the process returns to block 218, and the cycle repeats until the transmission box has been detected. The application determines the transfer protocol and then accepts the file authentication information from the display for the user to accept or deny. In block 222, the transfer application on device 170 determines whether the starting frame of the file being transferred has been found. If not, the process returns to block 218 until the starting frame has been recognized and then proceeds to block 224.

In a non-limiting exemplary embodiment, in block 224, the application uses the calibration elements to store known color values for deciphering subsequent data elements. In block 226, the application continues to accept the streamed data as a bit-stream for storage in protected memory and in block 228 the application tests for whether the end of the file frame has reached. If not, the process proceeds to block 230 and the application continues to store streamed data bytes and returns to block 228 to continue the reading cycle until the end of the file is reached in block 226. When the end of the file is reached in block 228, the user is queried whether to accept the file. Upon acceptance, the process proceeds to block 232, where the saved data stream is decoded and the decoded file is checked for errors, corrected if necessary, then moved from protected memory to the user's hardware storage media in device 170. Those of ordinary skill in the art will recognize that the user inquiry and acceptance can be accomplished during capture of the video stream of the data file and prior to acquisition of the complete data file. In block 234, the decoded copy of the data file can be used or if the file is an executable application, the application can be installed on mobile device 170. Upon successful installation of the application in block 234, the data file transfer application terminates in block 236.

In a non-limiting exemplary embodiment, the application can run on different layers of the portable device's operating systems. The application can be written in the Java® language to run in an Android© environment, or written in objective C to run in an iOS® environment, or written in C and C++ to run in a Linux® or Windows® environment, or written in the native language of any other programming language to run on other high level operating systems. The application can also be written to run on layers lower than a high level operating system to execute faster on the portable device's processor. Please refer to the description of FIG. 3 for further explanation.

The present concept can be accomplished using any of a multitude of variations. In one embodiment, the steps of conveyance of the data can be completed in a serial process or in a parallel process, wherein the data can be processed simultaneously or upon completion of the transfer thereof.

In a non-limiting exemplary embodiment, the exemplary embodiments presented herein describe a transmission signal 150 to a video receiving, decoding and display device, such as the video display unit 160, commonly referred to as a television. It is understood that the data display section 164 can be embedded into any video, including film, video tape, DVD, BLUE RAY® disc, projection films (such as large screen theaters, etc.), and the like. The film can be created with or without the data display section 164, where the data display section 164 would be either subsequently embedded therein or overlaid during the viewing process. Presentation of data display section 164 can be controlled by the user, allowing the system to display or conceal data display section 164, similar to current closed captioning, picture-in-picture, and the like.

In a non-limiting exemplary embodiment, the visual elements may be displayed in a three-dimensional format (3D) on a 3D display screen. If the mobile device has 3D camera capabilities (e.g., video signal shuttering technology) and the source transmits the video signal in a 3D format, then a dual-stream synchronized video signal—associated with 3D TV technology—can be learned by the mobile device.

In a non-limiting exemplary embodiment, the disclosure is directed toward one or more computer systems capable of carrying out the functionality described herein. An example of a computer device 100 (e.g., computer 130, mobile device 170) is shown in FIG. 1.

FIG. 1 sets forth illustrative computing device 100 that may be used to implement any aspect of the functions described above. For example, computing device 100 may be used to implement any aspect of optically transferring digital data to a portable electronic device. In all cases, computing device 100 represents one or more physical and tangible processing mechanisms.

Computing device 100 includes a communications infrastructure 106 that transmits/receive information from processor 104, main memory 108, display interface 102, secondary memory 110, and communications interface 124, for example. Display interface 102 provides images on a display 135. The secondary memory 110 may include a hard disk drive 112, removable storage drive 114 and/or interface 125. Such components receive information from removable storage units 118, 122. The communications interface 124 transmits information via a communications conduit 128. Such information is transmitted/received from an external source via a communications path 126.

Computing device 100 may also include volatile and non-volatile memory, such as RAM and ROM, as well as one or more processors 104 (e.g., one or more CPUs, and/or one or more GPUs, etc.). Computing device 100 may also include various media devices, such as a hard disk module, an optical disk module, and so forth. The computing device 100 can perform various operations identified above when the processor 104 executes instructions that are maintained by memory (e.g., RAM, ROM or elsewhere).

More generally, instructions and other information may be stored on any computer readable medium including, but not limited to, static memory storage devices, magnetic storage devices, optical storage devices, and so on. The term "computer readable medium" also encompasses plural storage devices. In all cases, computer readable medium represents some form of physical and tangible entity. By way of example, and not limitation, computer readable medium may comprise computer storage media and communications media.

Communication media typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Computing device 100 also includes an input/output module for receiving various inputs (via input modules), and for providing various outputs (via one or more output modules). One particular output mechanism may include a presentation module and an associated GUI. Computing device 100 may also include one or more network interfaces for exchanging data with other devices via one or more communication conduits. One or more communication buses communicatively couple the above-described components together.

Communication conduit(s) 128 may be implemented in any manner (e.g., by a local area network, a wide area network (e.g., the Internet), etc., or any combination thereof). Communication conduit(s) can include any combination of hard-wired links, wireless links, routers, gateway functionality, name servers, etc., governed by any protocol or combination of protocols.

Alternatively, or in addition, any of the functions described herein can be performed, at least in part, by one or more hardware logic components. For example, without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

The terms "module" and "component" as used herein generally represent software, firmware, hardware, or combinations thereof. In the case of a software implementation, the module or component represents program code that performs specified tasks when executed on a processor. The program code can be stored in one or more computer readable memory devices, as described with reference to FIG. 3 The features of the present disclosure described herein are platform-independent, meaning that the techniques can be implemented on a variety of commercial computing platforms having a variety of processors (e.g., desktop, laptop, notebook, tablet computer, personal digital assistant (PDA), mobile telephone, smart telephone, gaming console, and the like).

Each of the above methods may be executed using one or more processors on one or more computer devices 100. Embodiments may include various forms of distributed computing, client/server computing, and cloud based computing. Further, it will be understood that for each flow chart in this disclosure, the depicted steps or boxes are provided for purposes of illustration and explanation only. The steps may be modified, omitted, or re-ordered and other steps may be added without departing from the scope of this disclosure. Further, each step may contain one or more sub-steps. While the foregoing drawings and description set forth functional aspects of the disclosed systems, no particular arrangement of software and/or hardware for implementing these functional aspects should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. Each element of the block diagrams and flowchart illustrations, as well as each respective combination of elements in the block diagrams and flowchart illustrations, illustrates a function, step or group of steps of the methods, apparatus, systems, computer program products and/or computer-implemented methods. Any and all such functions may be implemented by computer program instructions, by special-purpose hardware-based computer systems, by combinations of special purpose hardware and computer instructions, by combinations of general purpose hardware and computer instructions, by a computer system, and so on. Any and all of which may be generally referred to herein as a "circuit," "module," or "system."

A programmable apparatus which executes any of the above mentioned computer program products or computer implemented methods may include one or more processors, microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computing device 100 may include a computer program product from a computer-readable storage media and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present disclosure are not limited to applications involving conventional computer programs or programmable apparatus that run them. It is contemplated, for example, that embodiments of the presently claimed disclosure could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized. The computer readable medium may be a non-transitory computer readable medium for storage. A computer readable storage medium may be electronic, magnetic, optical, electromagnetic, infrared, semiconductor, or any suitable combination of the foregoing. Further computer readable storage medium examples may include an electrical connection having one or more wires, a portable computer diskette, a hard disk, a random access memory (RAM), a read-only memory (ROM), an erasable programmable read-only memory (EPROM), Flash, MRAM, FeRAM, phase change memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present disclosure may take the form of web-based computer software, which includes client/server software, software-as-a-service, peer-to-peer software, or the like.

In embodiments, a computer may enable execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. Each thread may spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the entity causing the step to be performed.

There has thus been outlined, rather broadly, the more important features of the disclosure in order that the detailed description thereof that follows may be better understood, and in order that the present contribution to the art may be better appreciated.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the disclosure of the application, nor is it intended to be limiting as to the scope of the disclosure in any way.

What is claimed as new and what is desired to secure by Letters Patent of the United States is:

1. A method for optically transferring digital data from a computing system to a mobile computing device in visual communication with a visual display unit of the computing system, said method comprising the steps of:
   a. encoding and modifying a digital data file into a unique pattern of discrete visual elements; and
   b. embedding said digital data file in a video signal to be transmitted to the visual display unit wherein both said video signal and said unique pattern of discrete visual elements are visually displayed on said visual display unit in such a manner that the mobile device is capable of optically capturing and decoding said unique pattern of discrete visual elements back to said digital data file;
   during step a.,
      encoding the pattern of discrete visual elements using at least two layers of information, including: information represented by location on the display unit and at least one layer of monochrome or color information;
   during step b.,
      generating a calibration frame including elements of calibration for color or luminance of the visual display unit;
      after generating the calibration frame, generating a format frame including information describing element positions and encoding level used for encoding the data file;
      after generating the format frame, generating one or more data frames that collectively contain the digital data;
      at the beginning of each of the frames, generating a synchronization element to notify that a new frame is being displayed on the visual display unit;
      executing two-dimensional interleaving error correction process to correct a two-dimensional coordinate location of said discrete visual elements contained within a frame of said video signal, wherein block coding is used for error correction and each frame is a separate block.

2. The method in claim 1, wherein step b. automatically identifies a data display area of said unique pattern of discrete visual elements displayed on the visual display unit by detecting shape and pixel locations of said unique pattern of discrete visual elements.

3. The method in claim 1, wherein said video signal is one of a real-time broadcast signal and a pre-recorded digital signal stored on computer readable medium.

4. The method of claim 1, wherein said unique pattern of discrete visual elements is formatted in color.

5. The method of claim 1, wherein said unique pattern of discrete visual elements is formatted in black and white.

6. The method of claim 1, wherein said unique pattern of discrete visual elements has a predetermined geometric shape.

7. A system for optically transferring digital data from a computing system to a mobile computing device in visual communication with a visual display unit of the computing system, said system comprising: a memory for storing instructions; one or more processors in communication with the memory wherein said one or more processors are configured to:
   a. encode and modify a digital data file into a unique pattern of discrete visual elements; and
   b. embed said digital data file in a video signal to be transmitted to the visual display unit wherein both said video signal and said unique pattern of discrete visual elements are visually displayed on said visual display unit in such a manner that the mobile device is capable of optically capturing and decoding said unique pattern of discrete visual elements back to said digital data file;
   during step a.,
      encoding the pattern of discrete visual elements using at least two layers of information, including: information represented by location on the display unit and at least one layer of monochrome or color information;
   during step b.,
      generating a calibration frame including elements of calibration for color or luminance of the visual display unit;
      after generating the calibration frame, generating a format frame including information describing element positions and encoding level used for encoding the data file;
      after generating the format frame, generating one or more data frames that collectively contain the digital data;
      at the beginning of each of the frames, generating a synchronization element to notify that a new frame is being displayed on the visual display unit;
      executing two-dimensional interleaving error correction process to correct a two-dimensional coordinate location of said discrete visual elements contained within a frame of said video signal, wherein block coding is used for error correction and each frame is a separate block.

8. The system of claim 7, wherein step b. automatically identifies a data display area of said unique pattern of discrete visual elements displayed on the visual display unit by detecting shape and pixel locations of said unique pattern of discrete visual elements.

9. The system of claim 7, wherein said video signal is one of a real-time broadcast signal and a pre-recorded digital signal stored on computer readable medium.

10. The system of claim 7, wherein said unique pattern of discrete visual elements is formatted in color.

11. The system of claim 7, wherein said unique pattern of discrete visual elements is formatted in black and white.

12. The system of claim 7, wherein said unique pattern of discrete visual elements has a predetermined geometric shape.

13. A computer program product embodied in a non-transitory computer readable medium for optically transferring digital data from a computing system to a mobile computing device in visual communication with a visual display unit of the computing system, said computer program product comprising:
   a. first computer readable program code means for encoding and modifying a digital data file into a unique pattern of discrete visual elements; and
   b. second computer readable program code means for embedding said digital data the in a video signal to be transmitted to the visual display unit wherein both said video signal and said unique pattern of discrete visual elements are visually displayed on said visual display unit in such a manner that the mobile device is capable of optically capturing and decoding said unique pattern of discrete visual elements back to said digital data the;
   during step a., encoding the pattern of discrete visual elements using at least two layers of information, including: information represented by location on the display unit and at least one layer of monochrome or color information;

during step b., generating a calibration frame including elements of calibration for color or luminance of the visual display unit;

after generating the calibration frame, generating a format frame including information describing element positions and encoding level used for encoding the data file;

after generating the format frame, generating one or more data frames that collectively contain the digital data;

at the beginning of each of the frames, generating a synchronization element to notify that a new frame is being displayed on the visual display unit;

executing two-dimensional interleaving error correction process to correct a two-dimensional coordinate location of said discrete visual elements contained within a frame of said video signal, wherein block coding is used for error correction and each frame is a separate block.

14. The computer program product of claim 13, wherein step b. automatically identifies a data display area of said unique pattern of discrete visual elements displayed on the visual display unit by detecting shape and pixel locations of said unique pattern of discrete visual elements.

15. The computer program product of claim 14, wherein said video signal is one of a real-time broadcast signal and a pre-recorded digital signal stored on said non-transitory computer readable medium.

16. The computer program product of claim 15, wherein said unique pattern of discrete visual elements is formatted in color.

17. The computer program product of claim 16, wherein said unique pattern of discrete visual elements has a predetermined geometric shape.

\* \* \* \* \*